United States Patent [19]

Szwarcbier

[11] 4,253,086
[45] Feb. 24, 1981

[54] PROCESS AND APPARATUS FOR POSITIVE IDENTIFICATION OF CUSTOMERS

[76] Inventor: Szymon Szwarcbier, 3355 Queen Mary Rd., Apt. 730, Montreal, Quebec, Canada, H3V 1A5

[21] Appl. No.: 2,316

[22] Filed: Jan. 10, 1979

[30] Foreign Application Priority Data

Jul. 28, 1978 [CA] Canada ............................. 308362

[51] Int. Cl.³ ............................................. G06K 9/74
[52] U.S. Cl. ......................... 340/146.3 E; 340/149 A; 356/71
[58] Field of Search ................ 340/146.3 E, 149 A; 356/71

[56] References Cited

U.S. PATENT DOCUMENTS

| 2,085,935 | 7/1937 | Widenham | 340/146.3 E |
| 3,200,701 | 8/1965 | White | 340/146.3 E |
| 3,201,961 | 8/1965 | Williams et al. | 340/146.3 E |
| 3,383,657 | 5/1968 | Claassen et al. | 340/146.3 E |
| 3,398,558 | 8/1968 | Benenati | 340/146.3 E |
| 3,412,493 | 11/1968 | French | 340/146.3 E |
| 3,516,059 | 6/1970 | Hindman et al. | 340/146.3 E |
| 3,527,535 | 9/1970 | Monroe | 340/146.3 E |
| 3,928,842 | 12/1975 | Green et al. | 340/146.3 E |
| 4,048,618 | 9/1977 | Hendry | 340/146.3 E |

Primary Examiner—Leo H. Boudreau
Attorney, Agent, or Firm—Swabey, Mitchell, Houle, Marcoux & Sher

[57] ABSTRACT

The disclosure describes a process and a device for the identification of a person. The invention is based on the use of fingerprints. The master fingerprints appear on a card such as a credit card. When a person wants to be identified, his fingerprint is taken on a fingerprint card by means of a specially adapted fingerprinting device which enables the fingerprint to be formed along coordinates. Also, color is used. The fingerprint on the credit card appears in one color while the fingerprint on the fingerprint card appears in another color. By superimposing the two fingerprints, a third color develops, this means that the fingerprint belongs to the same person.

22 Claims, 46 Drawing Figures

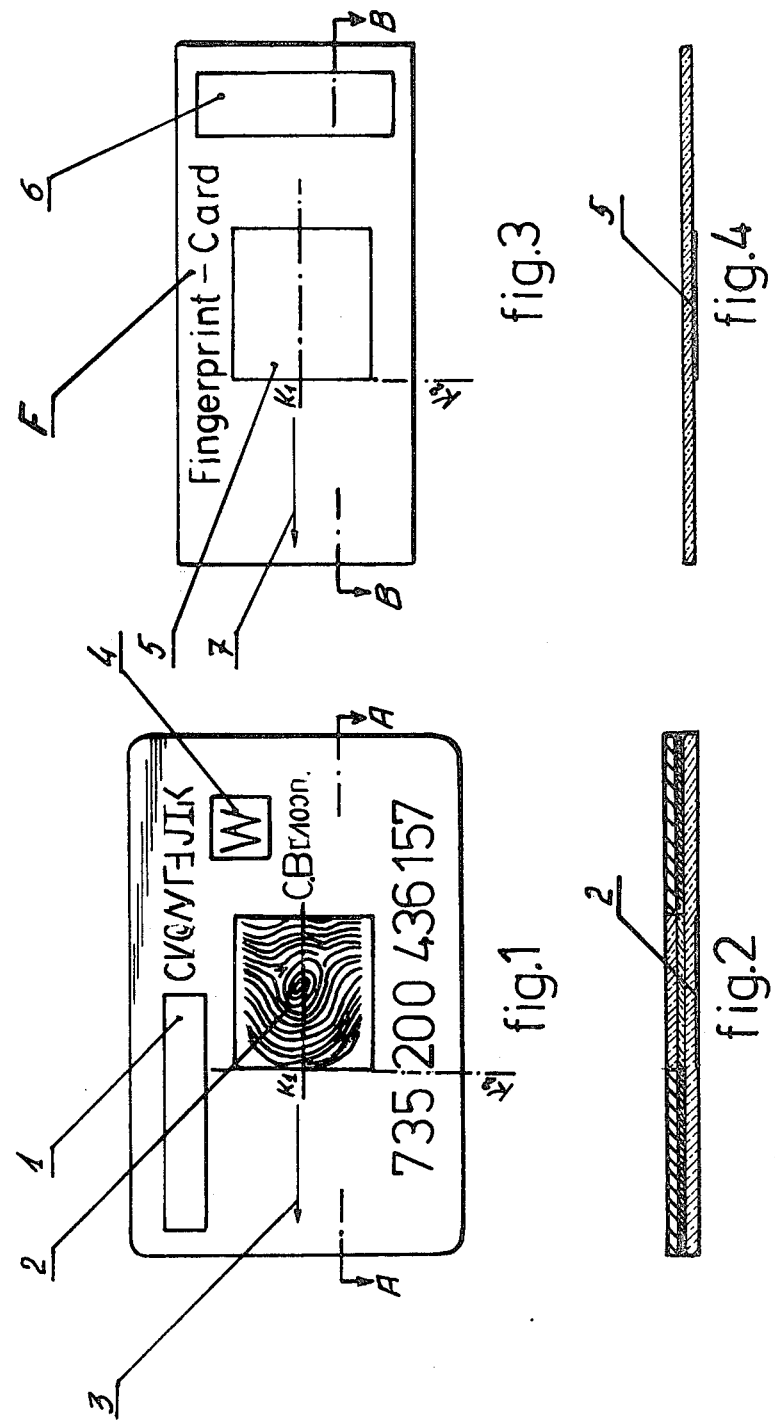

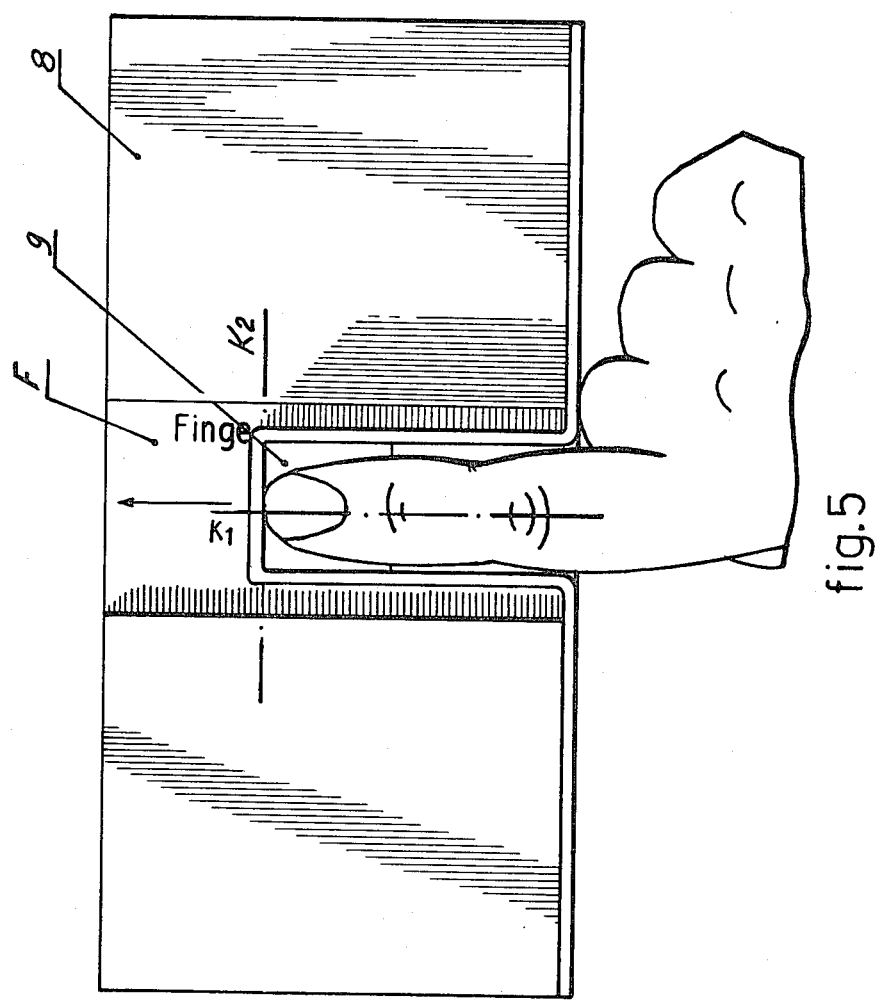

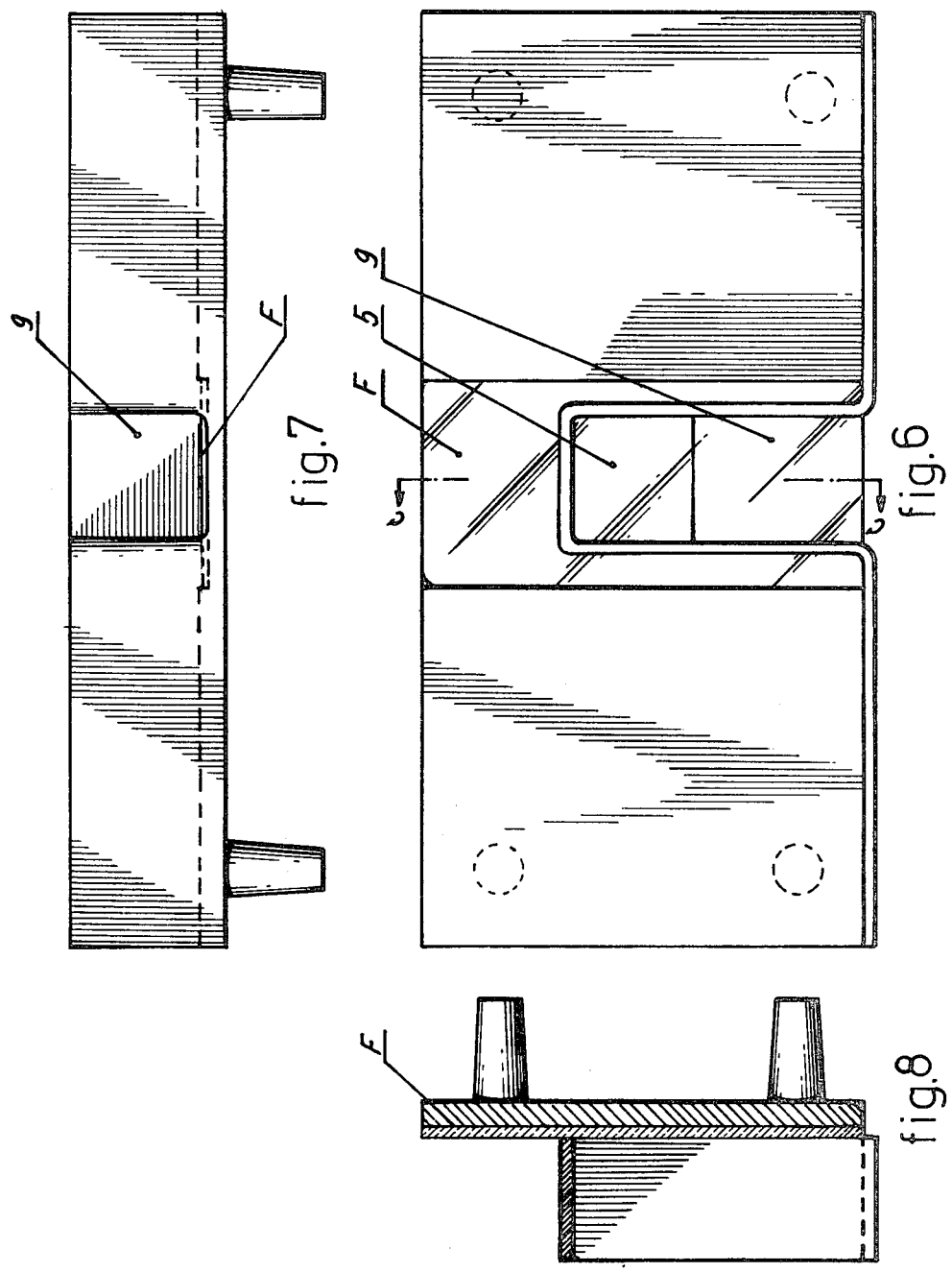

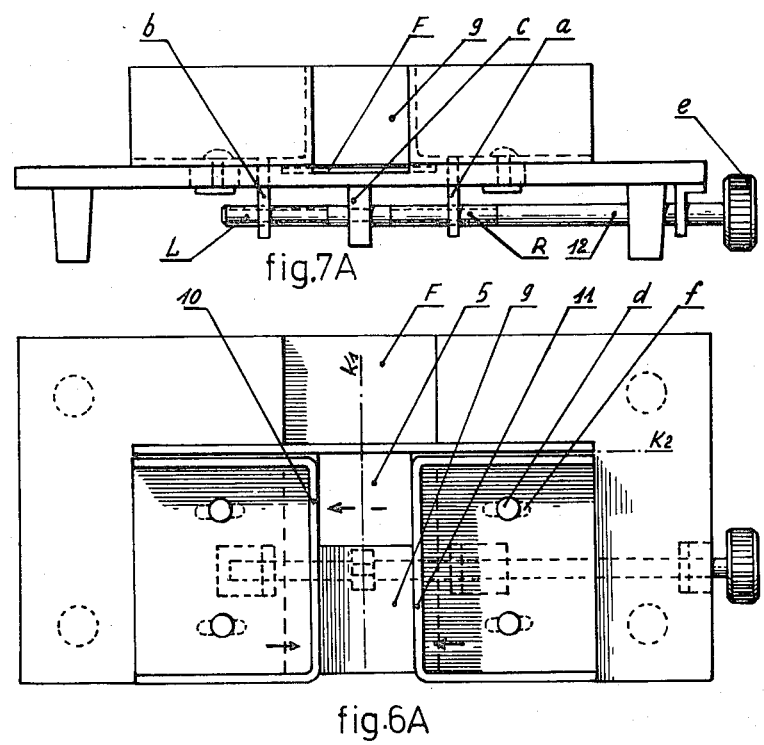
fig.7A
fig.6A
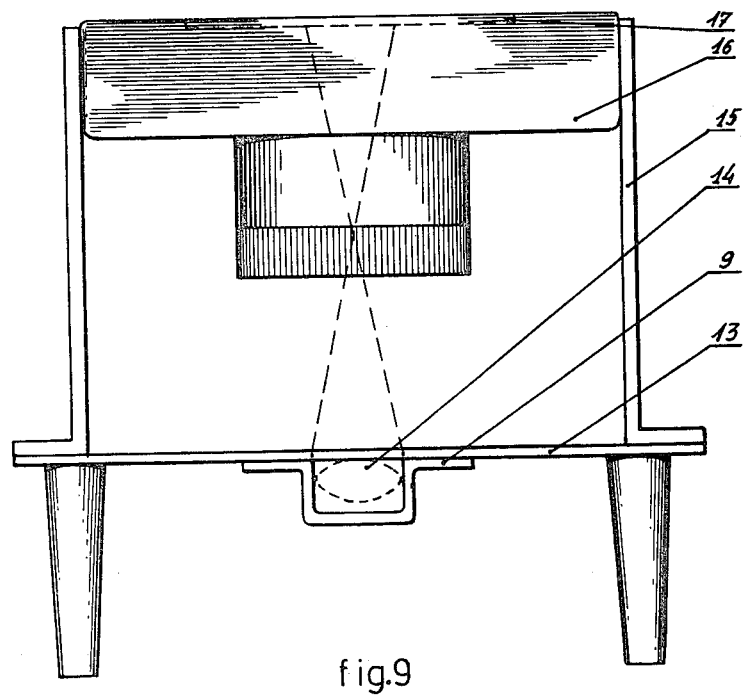
fig.9

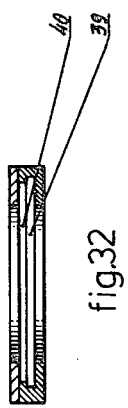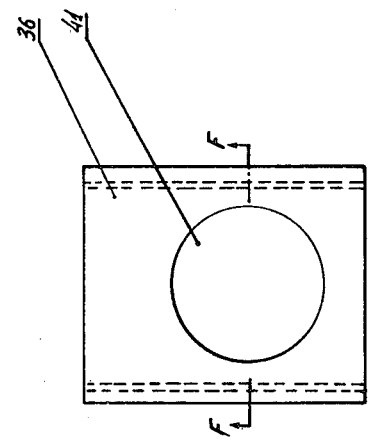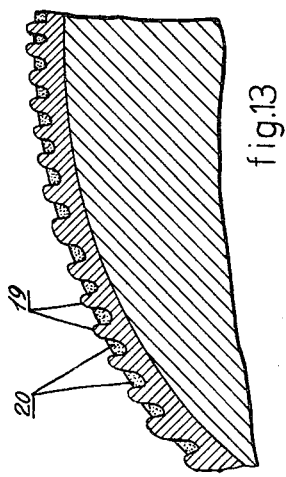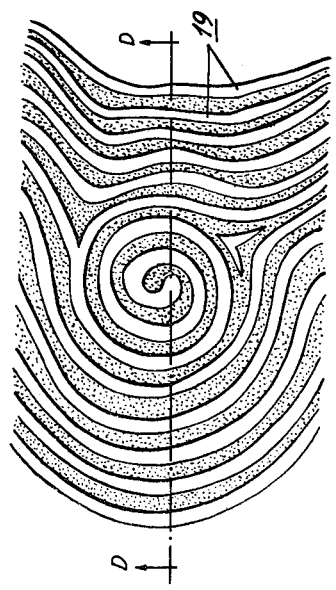

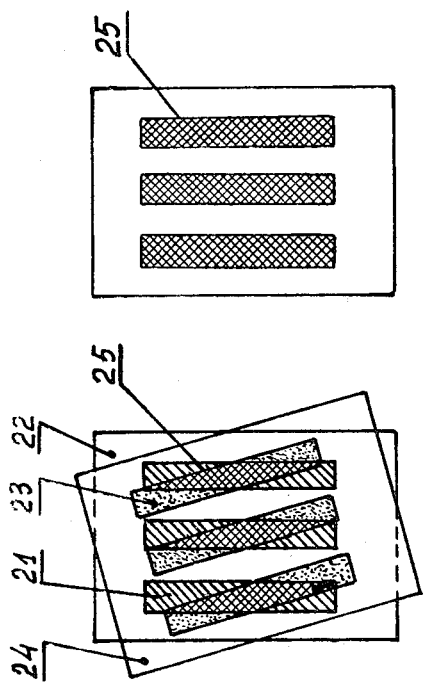
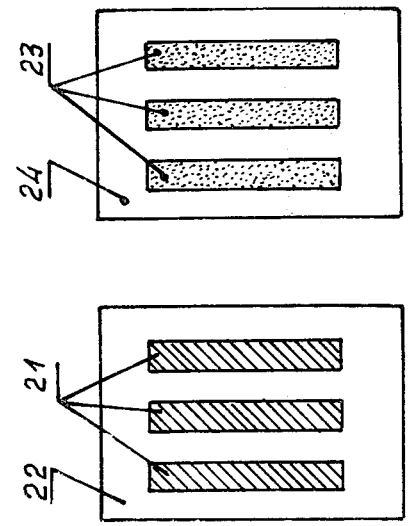
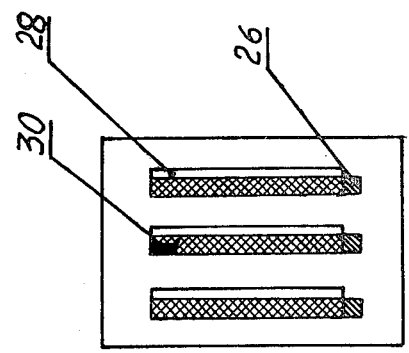
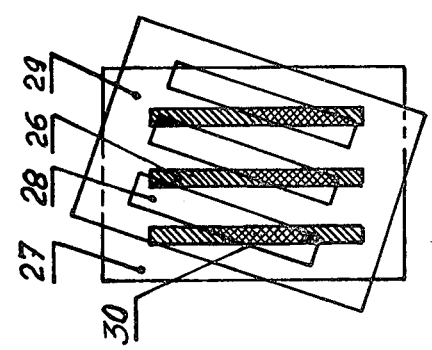
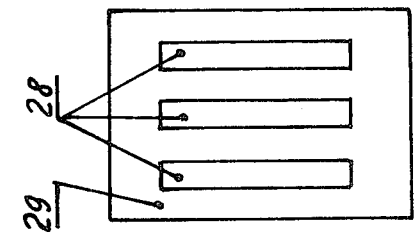
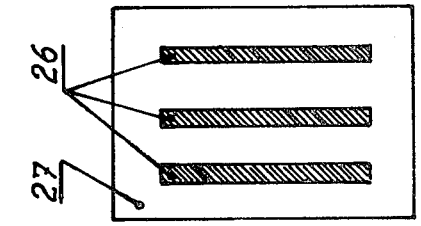

PROCESS AND APPARATUS FOR POSITIVE IDENTIFICATION OF CUSTOMERS

The invention concerns a process and devices for rapid, simple, inexpensive and infallible identification of persons in general, but more particularly of persons who wish to make credit purchases of merchandize, services, accomodation or money, by the means of various identity cards, credit cards, bank cards or similar cards.

By means of this invention, immediate identification is achieved by comparing the person's fingerprints as registered on an identity card, a credit card, a bank card or any other similar card, with his fingerprints taken during the transaction, on a corresponding chemically prepared or photo-sensitive fingerprint card.

The function of the invention is to eliminate persons who wish to come into illegal possession of merchandize, services, money or accomodation by using found, stolen or falsified identity, credit, bank or similar cards.

This process and devices are comprised of the following elements: (a) an identity, credit, bank or similar card which, in addition to a name, address, photograph, numbers or other information symbols, carries a fingerprint from a specific finger of a person, the said fingerprint being taken in a novel manner with an additionally novel fingerprinting device and being then inserted into or placed onto the card, the said card being also provided with a code letter or other code symbol indicating to which group the said fingerprint pertains; (b) a fingerprinting device by means of which a fingerprint may be taken mechanically or photographically; (c) a fingerprint card having a chemically-prepared surface upon which a fingerprint may be produced mechanically by pressing the tip of the finger thereon, or a light-sensitive surface upon which a fingerprint may be produced photographically; (d) a copying device by means of which the identity, bank, credit or similar card can be copied mechanically, optically or electronically onto or together with an invoice, cheque or similar form; (e) an optical apparatus with which the fingerprint or fingerprint photo on the identity, credit, bank or similar card may be observed together with the fingerprint or fingerprint photo, freshly made during the transaction upon the fresh fingerprint card; (f) a computer by means of which the fresh fingerprint or fingerprint photo made during the transaction upon the fresh fingerprint card, may be examined and compared with the preprogrammed fingerprint or fingerprint photo on the identity, bank, credit, or similar card; (g) an electronic device which is connected by leads to a computer by means of which the fresh fingerprint or fingerprint photo made during the transaction upon the fresh fingerprint card, may be examined and compared with the fingerprint or fingerprint photo, preprogrammed into the computer from the identity, bank, credit or similar card, so that all of the foregoing results in the comparison of the fingerprint or fingerprint photo on or in the identity, bank, credit or similar card with the fingerprint or fingerprint photo on the fresh fingerprint card, so that the immediate recognition is established as to whether or not the person presenting the identity, bank, credit or similar card is the same person as shown on it.

Up until the present, sales of goods and services through the use of credit cards or similar charge cards, have disadvantages. At the time of a sale or other credit transaction there is no control which can immediately determine that the person presenting a credit card is its legitimate owner. The signature on the invoice form, which the customer executes, cannot identify him with certainty. This signature can just as easily be falsified by a person not entitled to make the purchase.

As is well known, various companies issue credit cards for varying amounts of credit to their clients. These credit cards are usually supplied with a number and the name of the client. The suggestion has also been advanced that credit cards should incorporate a photo or a fingerprint of their legitimate owners. Control of the use of these cards, with positive identification of their owner, is however, unsatisfactory. A thief or a forger can easily alter his appearance through a wig, glasses or similar means. The fingerprint on the credit card, made in the conventional way, cannot be compared by the salesman or employee, with another one of the purchaser during the transaction, because so far no apparatus exists for this purpose.

In order to show the inadequacy of the presently-used sales method through credit cards or similar cards, such method is described as follows.

The owner of a credit card from a recognized organization can charge the amount for the merchandize purchased in certain stores through the use of his credit card. After the purchase, the salesman makes out the invoice, puts it into a suitably constructed copying device, with the purchaser's credit card and prints the number and the name of the client onto the invoice. He then submits it to the purchaser for signature and the client signs it. The client then receives one of the copies of the invoice, one remains with the salesman and one is sent to the bank.

For purchases up to $50.00, no control whatsoever is carried out. For higher amounts, the credit company is called by telephone. But the function of the call is limited to verifying that the client's line of credit has not been exceeded; the true identity of the client cannot be verified by this procedure. The thieves and forgers are aware of this. Thus they concentrate on making purchases below $50.00 in a number of stores. In this fashion they succeed in defrauding the credit company of amounts as large as several thousands of dollars. Prosecution of these thieves and fraud artists is difficult if not impossible, since they leave no trace. It is particularly easy for forgers who travel abroad; because of the fact that they come from a rich country, the overseas control is perfunctory only. Up until the present no effective control exists. A forger couple has been known to have gone on a world-wide trip within the use of credit cards, inflicting losses of hundreds of thousands of dollars on companies allowing credit.

Because of the absence of precise control, the credit companies suffer the loss of several millions of dollars per year.

However, not only material damage results from this lack of a precise means of control; other damage also takes place. Hijackers, terrorists, narcotics smugglers and other criminals can slip through the best guarded security barriers by changing their appearance and with falsified identity papers, and may thereafter destroy human lives.

As a remedy for this peril we suggest a new process and related devices which enable precise control at the time a purchase is accomplished or a service is obtained and prior to embarcation on a flight or other enterprise. The principle of this control is founded on a sound scientific basis, to wit, the process of fingerprinting (Dactyloscopy). It is based upon the fact that the so-called papillary lines are different for every person. They do not change from birth to death. These lines are particularly clearly recognizable at the tip of each finger. The police use this process to solve crimes. On the evidence of fingerprints, found or developed on the site of the crime or elsewhere, the perpetrators are identified and later tried and held responsible for their crimes.

However, the object of the invention is not to solve crimes, but rather to prevent them. Through the use of the fingerprint process involving the comparison of the fingerprint on the credit card, bank card, identity card or similar cards with the freshly made fingerprint on a fresh-fingerprint card, before going on a flight or such, a precise authentication of the person's identity will be made. This will deter criminal elements from the illegal appropriation of merchandize and services or from the perpetration of other criminal misdemeanour. A criminal would hardly dare make an illegal purchase when he must leave his fingerprint which may already be on file with the police department fingerprint-identification records. Nor would a would-be criminal want to leave his fingerprint to be placed on file.

By means of the invention, a credit card, bank card, identity card or other similar card—besides being provided with name, address, numbers or other information—will carry a fingerprint and a letter showing the characteristic group fingerprint pattern of the individual's fingerprints. Since this fingerprint will serve as a master for comparison with fingerprints which will be produced later, it has to be executed with particular care. Two methods are being suggested for the execution of the master fingerprints.

The first method is the usual mechanical reproduction of the fingertip. The fingertip has been considered as a sort of stamp. The fingerprint of a certain finger—for instance the index finger—is produced in the following manner, using a fingerprinting device. For the imprint, the fingertip must be in contact with the far wall of the fingerprinting device and the length axis of the finger should more or less coincide with the length axis of the fingerprinting device. The inside of the fingertip of the index finger will be pressed onto a blue stamp pad for example; the finger is then introduced into the fingerprinting device. The fingerprint is made by applying light pressure at the fingertip against a fingerprint card provided for this purpose. The fingerprint will then be enlarged several times by photographic means. The papillary lines are then retraced to form a sharp, clearly visible pattern on the enlarged fingerprint. This sharp image of the fingerprint will then be photographically reduced to its original size. This clear imprint will then be transferred onto a special place provided for on the credit card, preferably in reverse (mirror image) and aligned in a predetermined fashion. Preferably, this portion of the card should be transparent.

The second suggested method for the execution of the master fingerprint is being carried out entirely through photographic means. The photographic method is superior to the mechanical one. In the mechanical method the fingerprint may be somewhat altered depending on the pressure applied at the fingertip and by local turning or twisting of the finger. With the photographic method, no pressure is applied to the fingertip. Thus the image of the fingertip remains unaltered. The photographic reproduction of the fingerprint is done in the following fashion. In order to obtain a clear picture of the papillary lines, the fingertip will be tinted, for example, with an easily removable blue color. The linked fingertip will be dusted with powder, preferably white. The powder penetrates into the recesses of the skin, thus giving a clear picture of the papillary lines. The finger is then introduced into a fingerprinting device made for this purpose. When photographing the fingertip, it is also important that the fingertip touch the far wall of the device and that the length axis of the finger correspond as much as possible with the length axis of the device. The fingertip is now photographed with a suitably adequate camera, preferably at a scale of 1:1. The image will then be photographically enlarged to several times its size. The papillary lines are then retraced to form a sharp, clearly visible pattern on the enlarged fingerprint. This sharp image of the fingerprint will then be photographically reduced to its original size. This sharp image of the fingertip is now affixed to the special place provided for on the credit card as in the previous method. It is encapsulated in plastic in such a manner that if any attempt is made to alter the print, the whole credit card is immediately and obviously damaged. This last measure prevents falsification of the credit card. The image of the fingertip is best applied on transparent material, in reverse (mirror image).

The purpose of the fingerprinting device by which the mechanical or photographical fingerprint is obtained, is to retain the finger in a fixed, predetermined orientation. It is important for the later comparison of two fingerprints that the master fingerprint of the master fingerprint photo on the credit card have the same coordinates as the fingerprint or fingerprint photo on the fresh fingerprint card. The fingerprinting device provides two reference coordinates; one of the coordinates is the longitudinal axis and the second is the inside-face of the far wall of the device, which together form the letter T.

A further element of the process is the card bearing the fingerprint or photographic reproduction of the fingerprint, freshly taken at the time of the transaction. This card, which is very slightly narrower than the credit card, has a chemically prepared or photosensitive surface so designed that when placed above or below the master fingerprint card, the fresh fingerprint card's photosensitive surface fits exactly over or under the same spot as on the master fingerprint card. An arrow marks the direction in which the fingerprint or fingerprint photo is to be placed. The fingerprint or fingerprint photo will be made using a fingerprinting device similar to that used for making the master fingerprint or the master fingerprint photo on the credit card. In this way the fresh fingerprint or fresh fingerprint photo will have the same coordinates as the master fingerprint or the master fingerprint photo for the credit card.

Optical or electronic apparatus has been proposed, whose function it is to carry out the comparison between the master credit card fingerprint or fingerprint photo and the fresh fingerprint or fingerprint photo obtained during the transaction. This apparatus may take the form of viewer, episcope, projector, or computer. The optical apparatus is characterized by a housing fitted with adjustable optical equipment, adjustable frames to receive the credit card and the fresh print card, and a light source to light up or project these cards.

A new method of comparison is being suggested, so that the comparison of two fingerprints can be carried out by untrained persons. With the air of the following example this method is explained.

Upon a transparent slide is applied, for example, a figure in blue. Then, upon another transparent slide is applied, for example, a figure in red. Then, for example, the slide with the red figure is placed upon the slide with the blue figure. Then the red figure slide is manipulated so that the red figure covers, as much as possible, the blue figure underneath. Those portions of the lines which are in perfect congruence become purple in color. The parts which do not superimpose correctly retain their original colors, blue and red. When perfect congruence of the two figures is achieved, the whole pattern of lines appears in the color purple. Of course, two other colors may be selected which, in superimposition, result in the production of a third characteristic color. One of the colors must be dark and one must be light so that when one is over the other the mixing of the two produce a third color.

Because the comparison of two normal-size fingerprints, present difficulties, it is suggested that the colored fingerprints be greatly enlarged. It is well known that fingerprints have three main characteristics, to wit:

The whorl-print, which one signifies with a letter —W

The loop-print, which one signifies with a letter —L

The arch-print, which one signifies with a letter —A

The comparison of two different main characteristic fingerprints is easy to do because the lines of the two fingerprints will be predominantly intersected and the image which results will show three colors. It is much more difficult to compare two fingerprints which have the same main characteristic. Separately, they can be very much alike even though they have been taken from two different people. But, with the superimposition of the two colors using the proposed method, the difference in color will immediately be evident. The image will have three colors because lines which intersect will form a third color. This would mean that the two fingerprints come from two different persons. If the two fingerprints come from the same person and they have been made by the same finger, the fingerprints will cover each other in perfect congruence. Comparison will show an image of the single, mixed third color.

The same effect is obtained with projection apparatus. If one projects the color blue upon a screen and a second apparatus projects yellow light onto the same screen, the color resulting from the superimposition of the two projections would produce a third color, green.

According to the description of the mixing of colors by projection, a double adjustable projector is proposed, with which two transparent fingerprints or fingerprint photos, in different colors, may be compared by superimposition of the projected images.

A further characteristic of the invention is the comparison of the fingerprint or fingerprint photo on the identity, bank, credit, or similar card, with the fingerprint or fingerprint photo on the fingerprint card, by means of a computer.

A suitable computer is provided with a device consisting of a mechanism having a photoelectric cell or electron-beam radiator, and a cassette for the introduction of the fingerprint card. The computer memory is preprogrammed with the master fingerprint or fingerprint photo on the identity, bank, credit or similar card. When the comparison is carried out, the fingerprint card is introduced into the device. With the aid of the photoelectric cell of electron beam radiator, the mechanical of the said device scans the image of the fingerprint, line by line. If the two fingerprints coincide, a green light comes on or a buzzer is actuated. If the fingerprints are different, a red light comes on or a bell begins to ring.

Since the cost of a computer for comparing only two fingerprints or fingerprint photos, is expensive, it is proposed to provide separate devices connected by leads to the computer in such a manner that comparisons of two fingerprints or fingerprint photos may be carried out at many distant locations by connections between the individual devices and the computer.

In this connection it would be highly advantageous to connect up to existing computers which are at present performing other functions. This applies to credit companies, banks, and other organizations which have entire networks of small and large computers.

It is also proposed to connect the individual devices to the computer by telephone, either through a private or through a public telephone system. This would make it possible to establish a person's identity by fingerprint comparison from remote locations, even abroad.

The method of establishing identity by comparison of fingerprints or fingerprint photos, could also be extended, in that the said comparison could be carried out without the fingerprint card, namely, by using the fingertip itself. The tip of a specific finger could be compared with the master fingerprint, or fingerprint photo on an identity, bank, credit or similar card.

This possibility could open up further fields, namely where there is no operating staff, such as automatic banking machines located outside buildings, where a customer himself can withdraw money from his account, or service stations where a driver can fill up his tank and charge it, and similar situations.

It would be extremely useful to set up, in a given country, a computer centre and a network of electronic devices connected thereto in accordance with the method proposed, into which the fingerprints of citizens would be programmed. This would make it very easy to check a citizen's identity in many different circumstances and could thus reduce the crime rate in the country.

In the drawings which illustrate embodiments of the invention:

FIG. 1 shows a credit card in plan view;

FIG. 2 shows the section AA of FIG. 1;

FIG. 3 shows a fingerprint card in plan view;

FIG. 4 shows the section BB of FIG. 3;

FIG. 5 illustrates clearly the method of obtaining a fingerprint, using the fingerprinting device;

FIG. 6 is a plan view of the fingerprinting device;

FIG. 7 is a front view of FIG. 6;

FIG. 8 is a section along the line CC in FIG. 6;

FIG. 6A is a plan view of an adjustable fingerprinting device;

FIG. 7A is a front view of FIG. 6A;

FIG. 9 is a device for producing a fingerprint photograph by photographic means;

FIG. 12 shows a photographic enlargement of a portion of a "whorl" fingerprint ("The WHORL—W");

FIG. 13 is a section along the line DD in FIG. 12;

Figure 28:
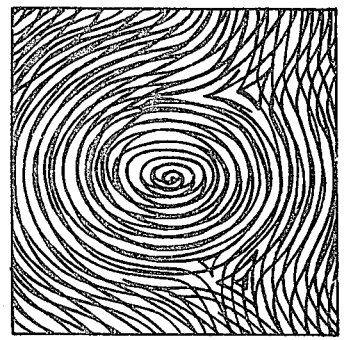
Figure 24:
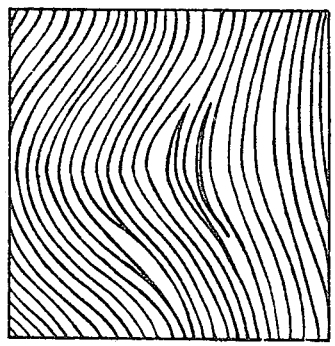
Figure 27:
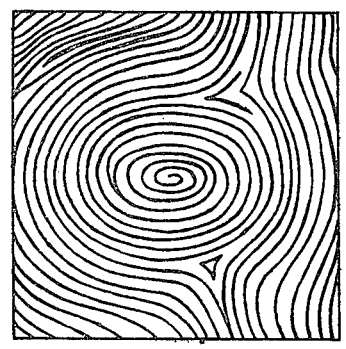
Figure 23:
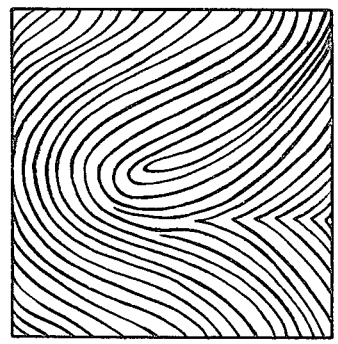
Figure 26:
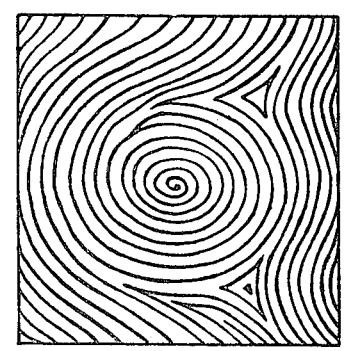
Figure 22:
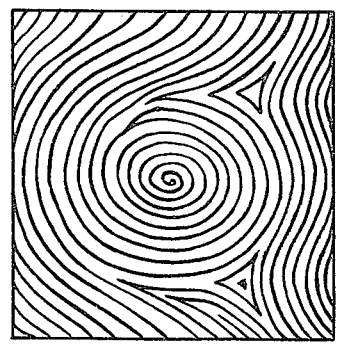
Figure 25:
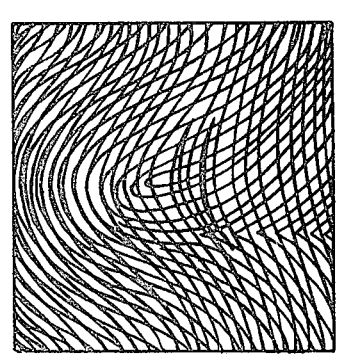
Figure 30:
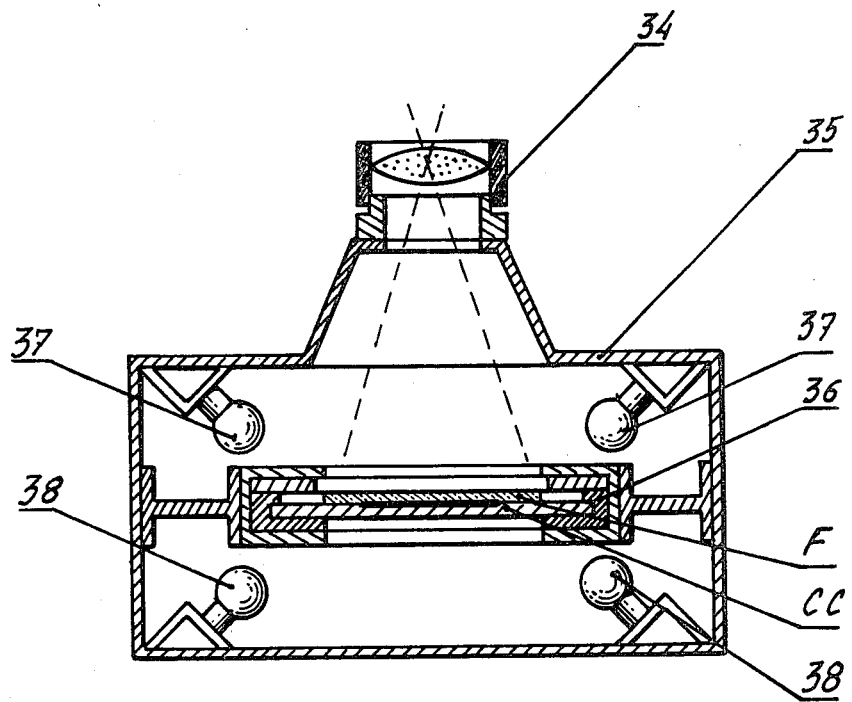
Figure 29:
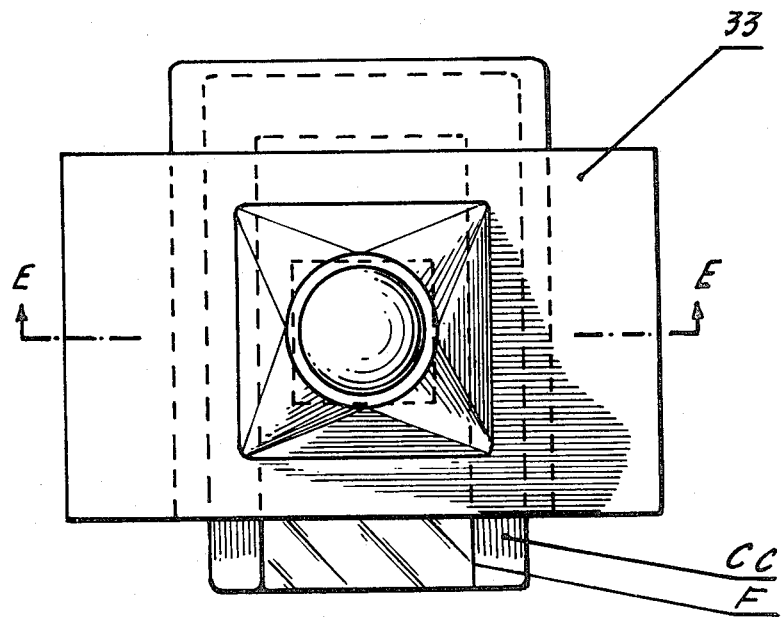
Figure 34:
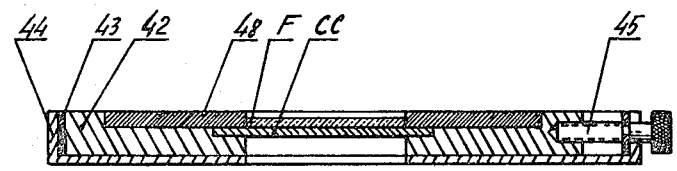
Figure 33:
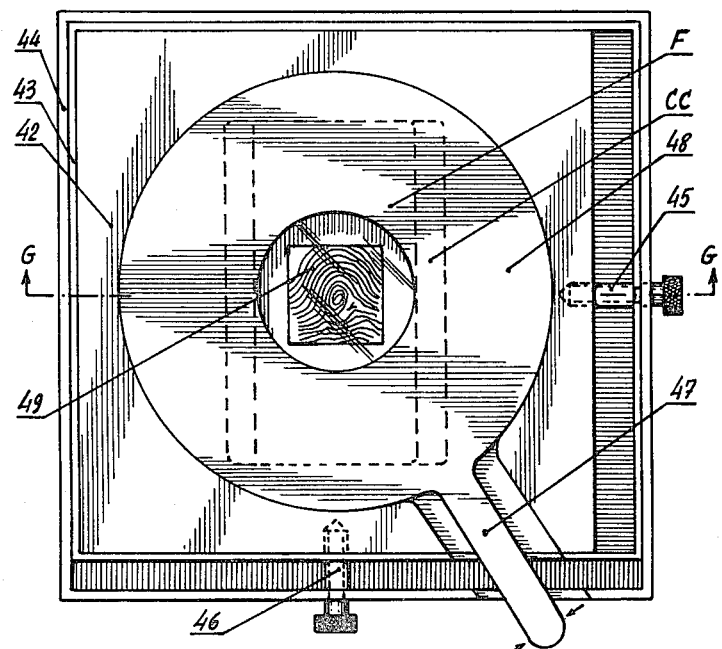
Figure 35:
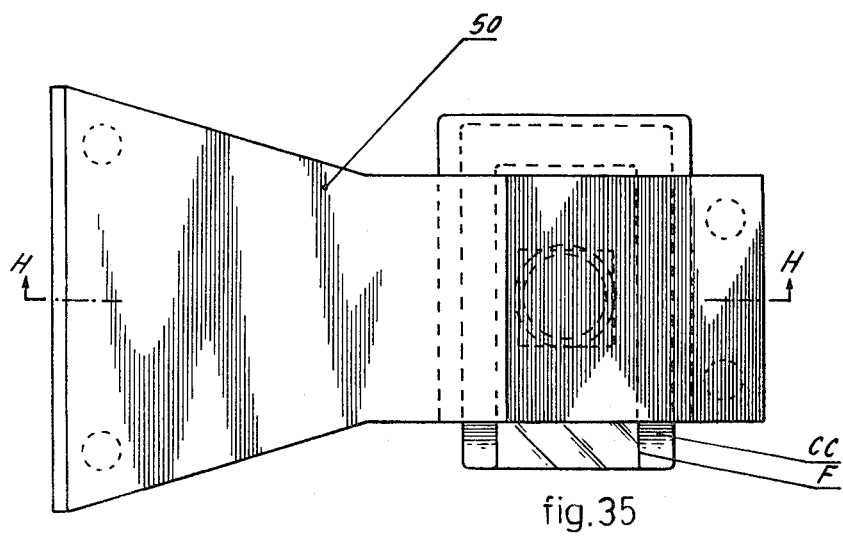
Figure 36:
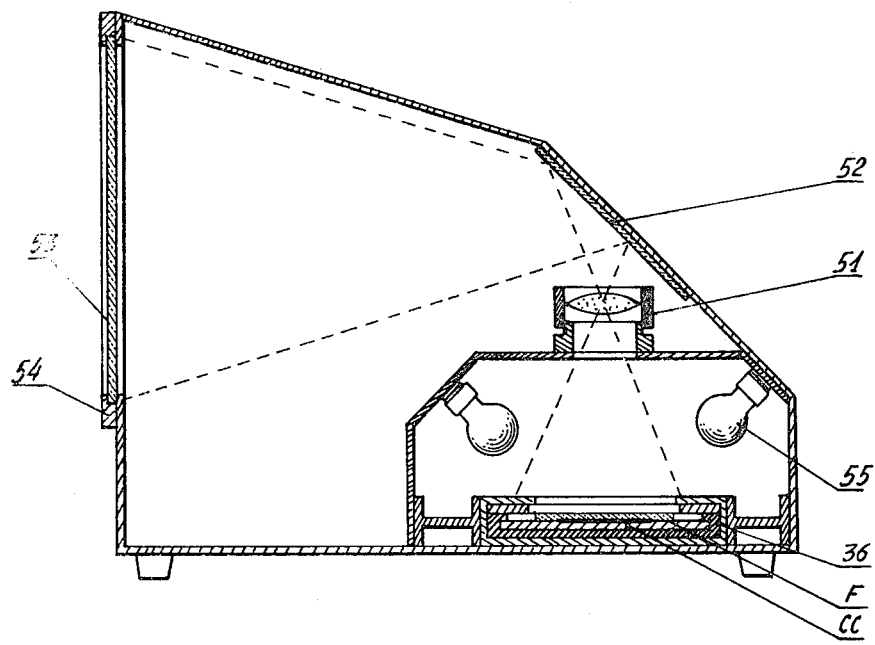
Figure 37:
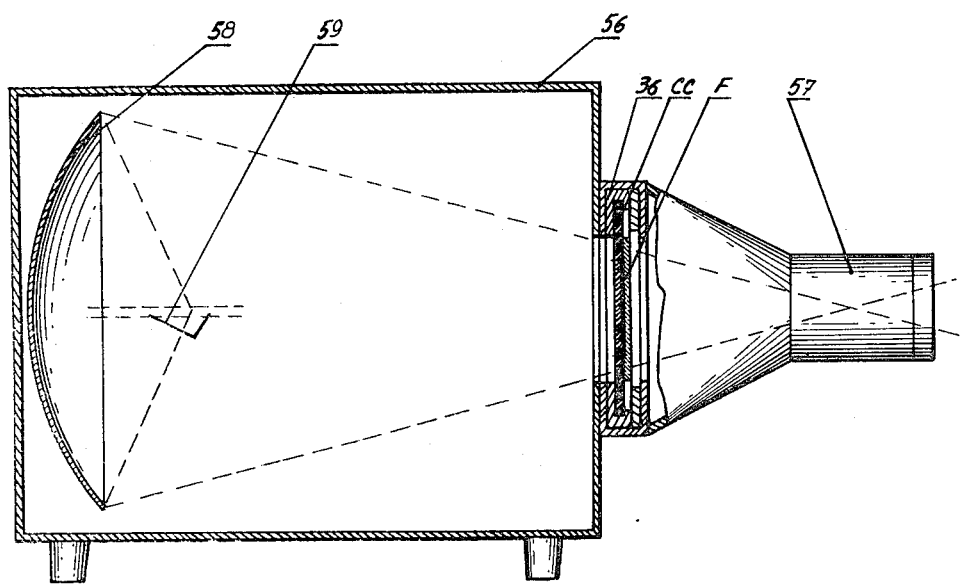
Figure 39:
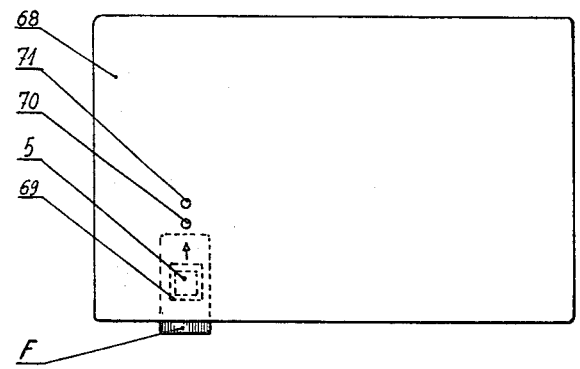
Figure 38:
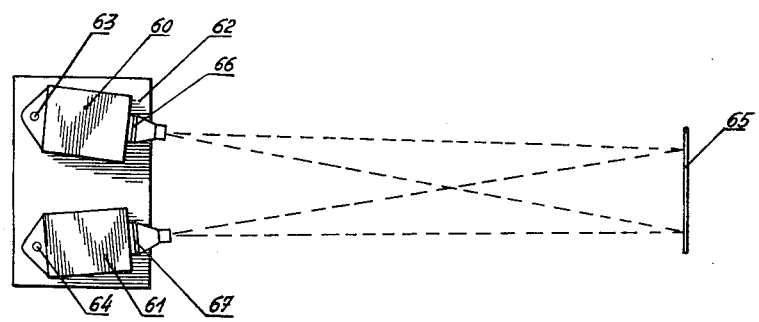
Figure 40:
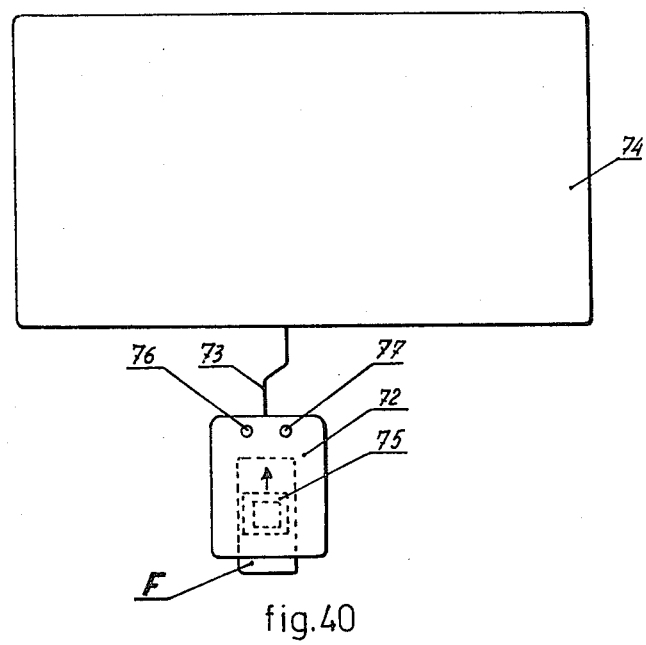
Figure 41:
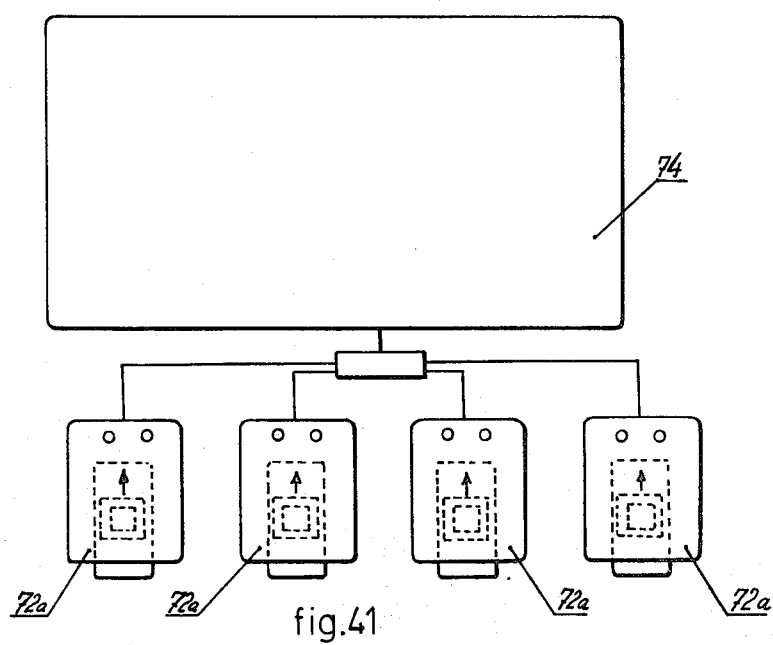

FIGS. 14 to 21 inclusive show phases in the comparison of two-tone figures by superimposing them;

FIG. 22 is an enlarged view of a whorl fingerprint (the whorl—W);

FIG. 23 is an enlarged view of a loop fingerprint (the loop—L);

FIG. 24 is an enlarged view of an arch fingerprint (the arch—A);

FIG. 25 is an enlarged view of the superimposition of a loop and an arch fingerprint;

FIGS. 26 and 27 are enlarged views of two different whorl fingerprints;

FIG. 28 shows the superimposition of the two whorl fingerprints shown in FIGS. 26 and 27;

FIG. 29 shows a viewer for the comparison of two fingerprints or fingerprint photos;

FIG. 30 is a section along the line EE in FIG. 29;

FIG. 31 shows the cassette frame for the credit card and fingerprint card;

FIG. 32 is a section along the line FF in FIG. 31;

FIG. 33 shows an adjustable, double cassette frame for the credit card and fingerprint card;

FIG. 34 is a section along the line GG in FIG. 33;

FIG. 35 is a plan view of an episcope for the comparison of two fingerprints or fingerprint photos;

FIG. 36 is a section along the line HH in FIG. 35;

FIG. 37 shows a projector, for comparing two fingerprints or fingerprint photos;

FIG. 38 shows two coupled projectors;

FIG. 39 shows diagrammatically a computer adapted to compare two fingerprints;

FIG. 40 shows an electronic device whereby two fingerprints may be compared at a distance in conjunction with a computer;

FIG. 41 shows many electronic devices connected by leads to a computer; and

Figure 42:
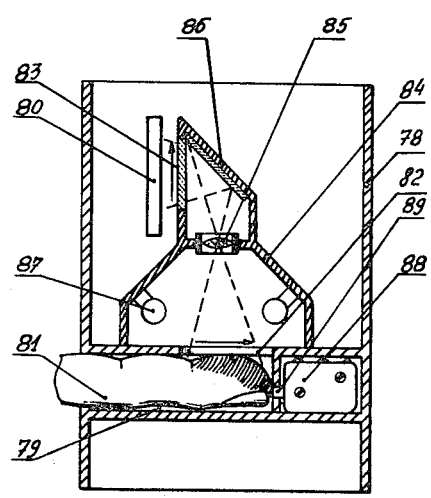

FIG. 42 shows an electronic device whereby, for the purpose of establishing a person's identity, a comparison may be made by direct scanning of the fingertip.

FIG. 1 illustrates a credit card giving the name of the credit company, the customer's name, an account number, a space for a signature 1 and a location where a fingerprint is placed 2, the said fingerprint being produced by means of a device described hereinafter. It is important that the fingerprint be arranged according to the same coordinates K1 and K2, as when it was in the fingerprinting device. Arrow 3 shows the direction in which the finger must be placed in the device. A letter 4, or some other symbol, indicates the group to which the fingerprint belongs. In this case, the letter "W" shows that the fingerprint belongs to the "WHORL" group. Thus, when the fingerprint is examined, two-thirds of the possible fingerprints are eliminated, since the examination may be limited to fingerprints in this group. If the comparison fingerprint belongs to another group, it is immediately obvious that there has been a forgery.

As shown in FIG. 2, which is a section along the line AA in FIG. 1, the credit card consists of a plurality of layers glued or welded together in such a manner that any attempt at delamination destroys the card.

The window for the fingerprint is preferably transparent and the fingerprint itself is produced in a color which contrasts with that on the fingerprint card, which is made as described hereinafter. In order that the fingerprint on the credit card may lie as close as possible to the fingerprint on the fingerprint card when the two are superimposed for comparison, it is preferably reproduced in mirror image and placed in the upper layer.

The fingerprint may be produced mechanically, i.e. by finger pressure, or photographically, i.e. with a camera. As previously mentioned, it is first of all enlarged, the papillary lines are sharply traced, and it is then reduced to its original size.

Figure 1A:
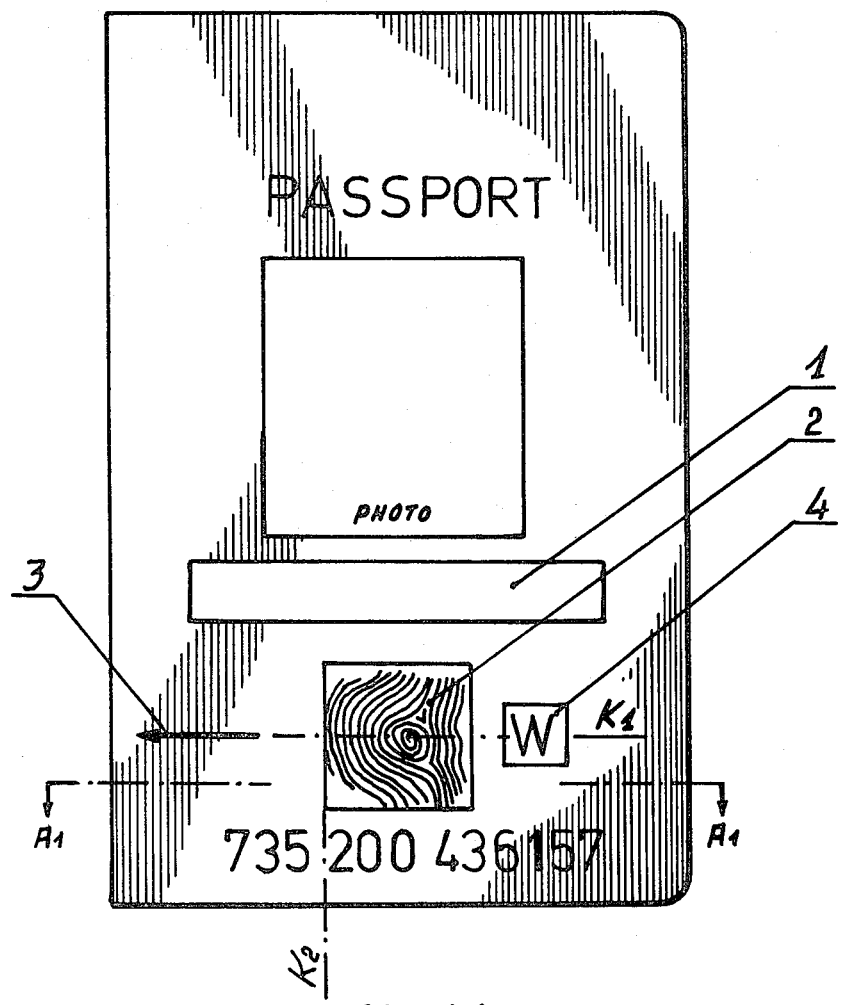
FIG. 1A shows the first page of a passport.

FIG. 1A shows the first page of a passport. In contrast to the credit card shown in FIG. 1, the passport also has a photograph. Otherwise, the lower part is provided, like the said credit card, with a fingerprint or fingerprint photo inserted in accordance with co-ordinates $K_1$ and $K_2$.

Figure 2A:
FIG. 2A is a section along the line A1—A1 in FIG. 1A.

FIG. 2A is a section along the line $A_1$—$A_1$ in FIG. 1A.

FIG. 3 shows a fingerprint card F upon which the customer's fingerprint is produced during the transaction and which is then compared with the master fingerprint on the credit card.

Fingerprint card F is made of a transparent material. It has an area 5 for a fingerprint and an area 6 for a signature. If the fingerprint is made mechanically, area 5 is subjected to a chemical treatment; if the fingerprint is made photographically, it is coated with a light-sensitive substance. This area is in exactly the same place as location 2 in the credit card. It also has the same coordinates $K_1$ and $K_2$ for a mechanical or photographic fingerprint. The fingerprint is produced in a color which contrasts with that of the fingerprint on the credit card. Arrow 7 shows the direction in which the finger must be inserted into the device while the fingerprint, or fingerprint photo is being produced.

FIG. 4 is a section along the line BB in FIG. 3.

FIG. 5 shows diagrammatically how a fingerprint is made on a fingerprint card F in a fingerprinting device 8.

A fingerprint card F is placed in the fingerprinting device below finger guide 9. The finger is placed in guide 9, with the longitudinal axis of the finger approximately parallel with coordinate $K_1$ and the tip of the finger in contact with coordinate $K_2$. The fingerprint is produced by light pressure upon chemically treated area 5.

FIGS. 6, 7 and 8 show the fingerprinting device in plan view, front elevation and cross-section along the line CC in FIG. 6. The dimensions of finger guide 9 are such that the tip of the finger lies in square 5 on the fingerprint card F.

FIGS. 6A and 7A illustrate another design of an adjustable fingerprinting device. In this case, finger guide 9 consists of three separate walls, walls 10 and 11, which run parallel with the longitudinal axis of the finger, being adjustable by means of a mechanism which moves them inwardly or outwardly and symmetrically with the longitudinal axis of finger guide 9. The said mechanisms consist of a shaft 12, two lugs a and b, a shaft bearing c, slide bolts d, a control knob e and slots f. Lug a is connected to the angle of wall 11, the bore in the said lug having a right-handed thread. Lug b is connected to the angle of wall 10 and the bore therein has a left-handed thread. When control knob e is turned to the right, or to the left, lateral walls 10, and 11 move, guided by slots f symmetrically with coordinate $K_1$.

This adjustable fingerprinting device has the advantage that the walls of the finger guide may be adjusted to the width of the customer's finger. All that is required by the proposed method is to produce one fingerprint or fingerprint photo which is accurately coordinated. The more accurately the fingerprint is located in relation to coordinates $K_1$ and $K_2$, the faster and more accurate the comparison.

FIG. 9 shows a fingerprinting device by means of which the fingerprint is produced photographically. A plate 13 is arranged upon a frame having four legs. Arranged under plate 13 is a finger guide 9 into which a finger 14 may be introduced. A camera 16 is mounted on two angle-brackets 15, and the fingerprint is produced on fingerprint card 17 which is coated with a light-sensitive layer. It is preferable to take the fingerprint photo on reverse film (direct positive).

Figure 10:
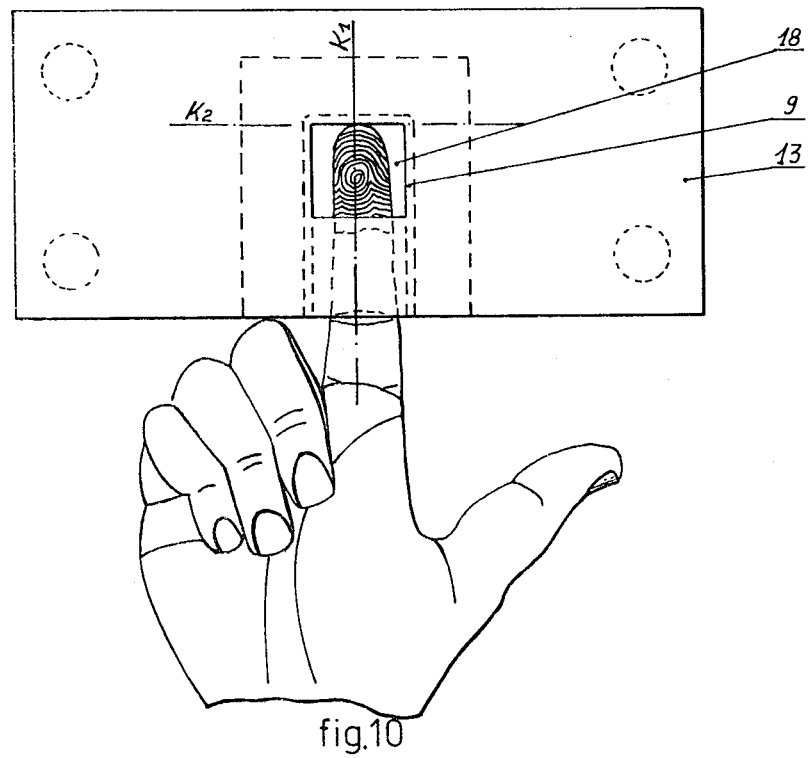
FIG. 10 shows diagrammatically how a finger is introduced into the fingerprinting device.

FIG. 10 illustrates diagrammatically how a finger is placed in finger guide 9 under plate 13 while a fingerprint photo is being taken. Aperture 18 is of the same size as area 5 on fingerprint card F. Here again, the longitudinal axis of the finger runs approximately parallel with coordinate $K_1$ and the fingertip touches coordinate $K_2$.

Figure 11:
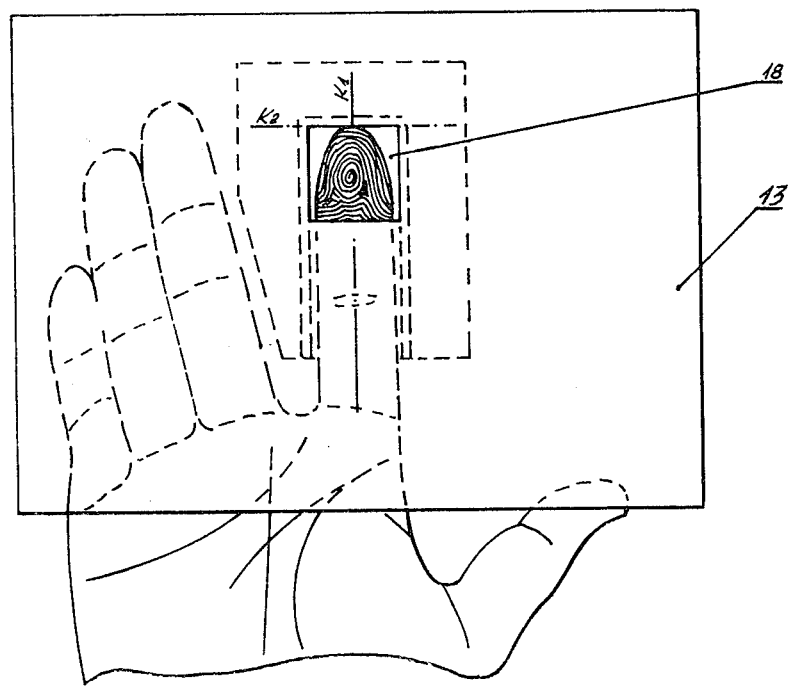
FIG. 11 shows another way of introducing a finger into the fingerprinting device.

FIG. 11 illustrates, diagrammatically, another way of introducing a finger in a fingerprinting device. In this case, the entire hand rests upon plate 13, and this prevents the finger from twisting or turning. Here again, opening 18 is of the same size as area 5 on fingerprint card F.

FIG. 12 shows an enlargement of a part of a whorl fingerprint, while FIG. 13 is a section along the line DD in FIG. 12, in which papillary lines 19 appear in the form of trapezoidal bars.

By coloring the fingertip with a dye easily removed by washing, and by sprinkling a powder of a contrasting color into depressions 20 in the papillary lines, a very sharp image of the fingertip may be obtained photographically.

FIGS. 14 to 21 inclusive illustrate a method of comparing two colored patterns by placing one upon the other. In FIG. 14, three rectangles 21, colored blue for example, are applied to a transparent plate 22, while in FIG. 15, three rectangles 23, colored red for example, are applied to a transparent plate 24. FIG. 16 shows plate 24 placed upon plate 22; this produces a new pattern containing three colors, the blue 21 and red 23 and now a mixed color VIOLET 25.

FIG. 17 shows plate 24 completely covering plate 22, in which case the only color visible is the mixed color violet.

FIG. 18 again shows three rectangles 26, colored blue for example, on a transparent plate 27, while FIG. 19 shows three rectangles 28, colored yellow for example, on a transparent plate 29. FIG. 20 shows plate 29 placed upon plate 27. In this case, three colors appear, blue 26, yellow 28 and, in the superimposed part, the mixed color green 30. In FIG. 21, plate 29 covers plate 27 completely, but the rectangles do not cover each other, and blue 26, yellow 28, and green 30 still appear.

This sytem is necessary for rapid comparison of two fingerprints or fingerprint photos, since the large number of lines in every fingerprint produce a jumble, upon being compared, if the two fingerprints are of the same color, however colored fingerprints or fingerprint photos, and coordinates $K_1$ and $K_2$, make it easy to carry out a comparison.

FIGS. 22, 23 and 24 show enlarged views of whorl W, loop L and arch A fingerprints.

FIG. 25 shows an enlarged view of a loop fingerprint L, superimposed upon an arch A fingerprint. The colored intersecting papillary lines 31 produce a mixed color, making it clear that the fingerprints of two persons are involved, and thus indicating fraud.

FIGS. 26 and 27 show two whorl fingerprints, W. It is difficult, at first sight, to realize that these two fingerprints are different. However, when they are superimposed, as shown in FIG. 28, the intersecting papillary lines 32, show that these fingerprints are from two different persons. Here again, this would indicate that a fraud was being perpetrated.

FIGS. 29 and 30 show a viewer 33 by means of which a comparison can be made between the fingerprint on the credit card CC and the fingerprint on the fingerprint card F. The said viewer consists of a housing 35, and adjustable lens 34, a double cassette frame 36 in which the said credit card CC, and fingerprint card F, are placed, and sources of light 37, 38. The interior of the housing is divided into two chambers. Light sources 37, 38 may be switched on at will to illuminate either the upper or lower chamber.

This arrangement makes it possible to use the viewer whether the fingerprint on credit card CC is opaque or transparent. If the fingerprint on the credit card CC is opaque, upper light source 37 is used; if it is transparent, lower light source 38 is switched on.

The examination as to whether the fingerprint newly made by the customer, at the time of the transaction, coincides with the print on the credit card CC presented, is carried out as follows.

Credit card CC, with the arrow on top, is inserted, in the direction of the arrow, into the lower slot in double cassette frame 36. Fingerprint card F, also with the arrow on top, and the fingerprint upside-down, is pushed into the cassette in the direction of the arrow, upon the credit card CC. The appropriate light sources are switched on. The image of the fingerprint is brought into sharp focus with the lens. It is then attempted, with very minimal movements of the fingerprint card, to make the fingerprint which it carries coincide with the fingerprint on the credit card.

FIGS. 31 and 32 illustrate double cassette frame 36 which has a guide 39 for the credit card CC and a guide 40 for fingerprint card F. Apertures 41 expose the image for viewing. The dimensions of guide 39 are such that the inserted credit card CC remains motionless. Guide 40 provides a certain amount of play allowing the fingerprint card to move slightly in all directions. If they cannot thus be made to coincide, a fraud is being perpetrated.

FIGS. 33 and 34 show a double cassette frame for the credit and fingerprint cards. Credit card CC is accommodated in housing 42 which can move in a kind of double carriage. The housing with the credit card can move in frame 43 to the left and right or vice versa. It can also slide, with frame 43, up and down or vice versa, in a second frame 44. The movements of the two carriages, and thus of housing 42, is controlled by two screws 45, and 46. Slots (not shown) in frames 43 and 44 allows screws 45, and 46 to move with housing 42. Fingerprint card F is accommodated in a rotating disc 48, which is fitted with a handle 47 and which can move in housing 42. Handle 47 may be used to rotate discs 48 about its center.

This makes it possible to impart a linear motion to the credit card and a rotary motion to the fingerprint card. Or, of course, the design may be such as to impart a rotary motion to the credit card and a linear motion to the fingerprint card. The movement may also be produced by other means, for example, by gearwheels, eccentrics or the like. This adjustable double cassette frame is necessary in order to make it possible to match the prints on the credit card and fingerprint card rapidly and accurately.

FIGS. 35 and 36 illustrate an episcope by means of which the fingerprints on the credit card CC and the fingerprint card F can be compared. The said episcope consists of a housing 50, an adjustable lens 51, a mirror 52, a screen 53, a frame 54, light sources 55 and a double cassette frame 36 into which the said credit and fingerprint cards may be inserted. The fingerprint image placed in cassette frame 36 is projected onto screen 53 by mirror 52. This double cassette is of the same design, and is manipulated in the same way, as the cassette for the previously described viewer, or that viewer illustrated in FIGS. 33 and 34.

The advantage of this episcope is that it provides a larger image which facilitates comparison, and that the image thus obtained may be observed by more than one person at a time.

FIG. 37 illustrates a projector for comparing two fingerprints, or fingerprint photos, by projecting them onto a screen. The said projector consists of a housing 56, an adjustable lens 57, a concave mirror 58, and arc-lamp 59, and a double cassette frame 36 into which a credit card CC and a fingerprint card F may be introduced. The images in the double cassette frame are projected onto the screen. The double cassette frame is of the same design, and is manipulated in the same way, as that in FIGS. 31, and 32 or FIGS. 33 and 34.

FIG. 38 shows two projectors 60 and 61 which are coupled together and are arranged upon a plate 62 in such a manner that they can rotate about centers 63, and 64 and can therefore match the images projected onto screen 65. The two projectors contain single cassette frames, i.e. a credit card cassette frame 66 for projector 60 and a fingerprint card cassette frame 67 for projector 61. Since the fingerprints are in contrasting colors, for example blue and red, any intersecting papillary lines will appear in the mixed color VIOLET.

FIG. 39 is a diagrammatic representation of a computer by means of which two fingerprints may be compared.

Fingerprint card F is introduced into the computer device 68. A photoelectric cell or electron-beam radiator not shown, working together with a mechanism 69, scans area 5 line by line. If the fingerprint on the fingerprint card coincides with the preprogrammed fingerprint on the identity, bank, credit or similar card a green light 70 comes on or a buzzer is actuated; if the fingerprints are different; a red light 71 comes on or a bell begins to ring.

FIG. 40 shows an electronic device 72 connected to the computer 74 through a lead 73.

The electronic device consists of a housing into which a cassette for fingerprint card F may be introduced, and a mechanism 75 having a photoelectric cell or electron-beam radiator not shown. The comparison is carried out as follows: fingerprint card F is introduced into the cassette in the device. Mechanism 75 imparts a line-by-line movement to the photoelectric cell or electron beam radiator which scans the fingerprint image. The information passed to the computer is compared. with the preprogrammed fingerprint image on the identity, bank, credit or similar card. If the two fingerprints coincide, a green light 76 comes on, or a buzzer is actuated; if the fingerprints are different, a red light 77 comes on or a bell begins to ring.

FIG. 41 shows many electronic devices 72A connected through leads to a computer 74. The function of each electronic device is as already described in FIG. 40. Each of the devices may be connected selectively to the computer for comparison purposes.

FIG. 42 shows an electronic device whereby two fingerprints may be compared without a fingerprint card. In this case, the fingerprint card is replaced by a projection of the fingertip on a small screen. This arrangement converts the three-dimensional finger to a flat image, which improves the comparison with the preprogrammed flat image of the fingerprint on the credit card. The electronic device consists of a housing 78 comprising a fingerprinting device 79 of a small episcope projector, and of a mechanism 80, provided with photoelectric cells or electron beam radiators with which the projected image of the fingertip may be scanned line-by-line. The finger device has a channel into which the finger 81 may be introduced.

The channel is of a size such that the fingertip is aligned with two coordinates, namely, close to the longitudinal axis of the channel and, at the fingertip, at right angles to the longitudinal axis of the finger. Located at the top of the channel is a window 82 through which the fingertip may be projected onto the screen 83. The episcope projector consists of a housing 84, a lens 85, a mirror 86, and light sources 87. The finger device is provided with a micro-switch 88. When the finger is placed in the channel, lever 89 switches on the light sources 87 and sets the device in operation.

In accordance with the suggested method, the master fingerprint or the master fingerprint photo should be carried out at a studio specially equipped for this purpose. The employees of this studio must have two characteristics: One is that they must be completely trustworthy, and the second that they have competent knowledge of photographic processes.

A person to whom a credit company or bank wishes to issue a credit card, must go to the studio and bring suitable documents which establish his or her identity. For example the following documents are suggested as sufficient for the purpose: a valid identification, passport or birth certificate. In certain instances, acceptable witnesses may also satisfy the requirement.

The master fingerprint or master fingerprint photo will only be made by the studio employees after satisfactory identification has been proven. Two of the master fingerprints or master fingerprint photos, with description of the customer's identification, will then be sent to the bank or credit company. One master remains at the studio and will be kept in a photo index file. The credit company or the bank uses one master for the preparation of the credit card, the second master will be kept in a card index file. The bank therefore possesses both the name and address of the customer and his master fingerprint or master fingerprint photo, to be used as a master control for identification of the client. The studio also retains the same information in his photo index file. The customer may make reference to his master fingerprint or master fingerprint photo at the studio, when he later applies for credit cards from banks or other companies issuing credit cards. The banks or credit companies have then only to request a master fingerprint or master fingerprint photo identification from the studio.

The invoicing with credit card or similar card will be carried out in the following manner.

When an invoice is made out, the customer is asked to show his credit card. The card is introduced, together with the completed invoice form, into a copying device. It is then copied. The customer's fresh fingerprint or fresh fingerprint photo is then taken on a special fingerprinting device and applied onto a fresh fingerprint card. The credit card is introduced, in the direction of the arrow, into the double cassette of one of the optical units. The fingerprint card is then also placed, in the direction of the arrow, upon the credit card, but with the printed side down. The fingerprint card must be inverted because the fingerprint on the credit card is in mirror image. This arrangement was conceived to allow the two fingerprints to lie close together, without the spacing caused by the thickness of the material of the fingerprint card.

After the double cassette has been inserted into the optical unit, the two fingerprints are checked in accordance with the fingerprint comparison method.

If the two fingerprints superimpose completely and produce a uniform third color upon viewing, it can be assumed that the customer is the rightful owner of the credit card. If the papillary lines of the fingerprint intersect instead, and if three colors appear, there is evidence of fraud.

After the examination, the fingerprint card will be attached to the invoice signed by the customer. These will be sent to the credit company. The credit company thus has the opportunity to re-examine the fingerprints. Their examination may be carried out using duplicates of the equipment described above.

If the comparison is carried out with the aid of a computer, the fingerprint on the identity, bank, credit, or similar card is first of all programmed into the computer memory, whereupon the fingerprint card, with the freshly made fingerprint, is introduced into the computer or into the cassette in the electronic device. After a short time, the results of the comparison will be made known by visual or acoustic signals.

I claim:

1. Device for the identification of a person by means of an identity, credit, bank or the like card which, in addition to a name, address, photograph, numbers or other information symbols, carries a master fingerprint from a specific finger of a person, said master fingerprint being taken with a fingerprinting device and being then placed onto the card, said card optionally being provided with a code indicating to which basic main fingerprint group the said fingerprint pertains; and a copying device by means of which the identity, bank, credit or similar card can be copied with an invoice, cheque or similar form, characterized in that said card is transparent and said master fingerprint is formed on said card in a first color, said device comprises a fingerprint card made of a transparent material and possessing a surface enabling a finger print of said finger to appear thereon in a second color, said surface being arranged in such a manner that, with the finger inserted in a fingerprinting device, the fingerprint can be taken in accordance with one coordinate close to the longitudinal axis of the finger and a second, running at the fingertip, at right angles to the longitudinal axis of the finger, said fingerprinting device comprising a finger guide for said finger, which is formed and proportioned in such a way that the fingerprint can be carried out in direct relationship to two coordinates, namely the approximate longitudinal axis of the finger and to a right angle at the tip of the finger, so that by superimposing the card over the fingerprint card a new color will develop if the two fingerprints correspond, establishing as to whether or not the person presenting the identity, bank, credit or the like card is the same person as shown on it.

2. Device according to claim 1, characterized by the fact that it is provided with a symbol for the basic design of the fingerprint, consisting of:
   the letter W representing the WHORL
   the letter L representing the LOOP, and
   the letter A representing the ARCH.

3. Device according to claim 1, characterized by the fact that the finger guide comprises three separate walls, two of which run parallel to the longitudinal axis of the finger and are adjustable.

4. Device according to claim 3, which comprises a mechanism to move the two walls which are parallel to the longitudinal axis of the finger in such a way, that these may be moved symmetrically with relation to the longitudinal axis of the finger guide, an equal distance inwardly or outwardly.

5. A device according to claim 1, characterized in that said finger guide has a recess for the fingertip, and a camera is connected to the said guide in such a manner that a photo of the fingertip can be taken on a fingerprint card always in relation to two coordinates, namely, close to the longitudinal axis of the finger and, at the fingertip, at right angles to the longitudinal axis of the finger.

6. A device according to claim 5, characterized in that the finger guide consists of three separate walls, two walls running parallel with the longitudinal axis of the finger being adjustable.

7. A device according to claim 6, characterized in that a mechanism moves the two walls running parallel with the longitudinal axis of the finger, in such a manner that the said walls may be adjusted inwardly or outwardly and symmetrically with the longitudinal axis of the finger guide.

8. A device according to claim 1, wherein said fingerprint card contains an additional surface for a signature and for an arrow indicating the direction in which the fingerprint should be produced.

9. A device according to claim 8, wherein said fingerprint card has a chemically prepared surface enabling a colored fingerprint, contrasting with the fingerprint on the card to be produced.

10. A device according to claim 8, wherein the fingerprint card has a light-sensitive surface enabling a direct, positive fingerprint, in color, to be produced.

11. A device according to claim 1, comprising a viewer characterized in that it comprises an adjustable lens, light sources adapted to be switched on selectively, a double cassette for the accommodation of an identity, bank, credit or similar card and a fingerprint card, so arranged that a comparison can be made by placing one of the fingerprints on these cards over the other fingerprint.

12. A device according to claim 11, wherein the viewer is characterized in that it is equipped with a light source in so arranged that when the light source is switched on, the said comparison may be carried out with transparent surfaces.

13. A device according to claim 11, wherein the double cassette is characterized in that it comprises two guides, one for the accommodation of the identity, bank, credit or similar card and the other for the accommodation of the fingerprint card, the dimensions of the said cassette being such that the surfaces carrying the fingerprints lie one upon the other, one of the said cards being held stationary, the other card being adjustable.

14. A device according to claim 13, wherein the double cassette is characterized in that it is provided with a mechanism such that the individual cassettes, one for the identity, bank, credit or similar card and one for the fingerprint or fingerprint photo card, may be adjusted linearly or by rotation, by means of adjusting screws, turntables, or the like.

15. A device according to claim 1, comprising an episcope unit, characterized in that it comprises an adjustable lens, a mirror, light sources, a screen, and a double cassette for the accommodation of an identity, bank, credit or similar card and a fingerprint card, so arranged that the projected image of the superimposed fingerprints or fingerprint photos may be adjusted and compared.

16. A device according to claim 1, comprising a projection apparatus characterized in that it comprises an adjustable lens, a concave mirror, an arc lamp, and a double cassette for the accommodation of an identity, bank, credit or similar card and a fingerprint or fingerprint photo card, in such a manner that the image, projected onto a screen, or the two superimposed fingerprints, or fingerprint photos may be adjusted and compared.

17. A device according to claim 1, which comprises two projection units of the same design which are adjustable upon a stand, and wherein a fingerprint, or a fingerprint photo, may be projected from each unit onto a screen for purposes of comparison, the one fingerprint being of a dark color and the other of a light color.

18. A device according to claim 1, including a computer having stored therein the fingerprint appearing on the identity, bank, credit or similar card, which comprises a cassette for the accommodation of a fingerprint card, a photoelectric cell or electron beam radiator working together with a mechanism in such a manner that the fingerprint on the fingerprint card introduced thereinto, is scanned line-by-line, is compared by the computer with the already-preprogrammed fingerprint on the identity, bank, credit or similar card, and the result of the comparison is immediately made known.

19. A device according to claim 18, which comprises a projector which projects the fingertip onto a screen, a photoelectric cell associated with said computer, in such a manner that the information relating to the image of the fingertip projected onto the screen, which is obtained by scanning with the photoelectric cell or electron beam radiator, is passed to the computer, is compared thereby with the preprogrammed fingerprint or fingerprint photo on the identity, bank, credit or similar card, and the result of the comparison is immediately returned to the device in the form of signals.

20. A device according to claim 19, which comprises a microswitch associated with said fingerprinting device arranged in such a manner that, when the finger is inserted into the finger channel, the projector light sources are switched on and the device is set in operation.

21. A device according to claim 1, which comprises computer means capable of detecting different colours and after having detected such colours, it can advise whether the fingerprint carried by the fingerprint card is the same as the master fingerprint.

22. A process for the identification of a person which comprises providing an identity, credit, bank or the like card which, in addition to a name, address, photograph, numbers or other information symbols, carries a master fingerprint from a specific finger of a person, said master fingerprint being taken with a fingerprinting device and being then placed onto the card, said card optionally being provided with a code indicating to which basic main fingerprint group the said fingerprint pertains; and providing a copying device by means of which the identity, bank, credit or similar card can be copied with an invoice, cheque or similar forms, characterized by providing a transparent card and forming said master fingerprint on said card in a first color, said fingerprint card being made of a transparent material and possessing a surface enabling a finger print of said finger to appear thereon in a second color, arranging said surface in such a manner that, with the finger inserted in a fingerprinting device, the fingerprint can be taken in accordance with one coordinate close to the longitudinal axis of the finger and a second, running at the fingertip, at right angles to the longitudinal axis of the finger, providing a finger guide for said finger, which is formed and proportioned in such a way that the fingerprint can be carried out in direct relationship to two coordinates, namely the approximate longitudinal axis of the finger and to a right angle at the tip of the finger, superimposing the card over the fingerprint card and if a new color develops it will indicate that the two fingerprints correspond, establishing as to whether or not the person presenting the identity, bank, credit or the like card is the same person as shown on it.

* * * * *